United States Patent [19]

Kasey

[11] 4,266,336
[45] May 12, 1981

[54] FIXTURES AND METHODS FOR DYNAMO SERVICING

[75] Inventor: Michael K. Kasey, Palatine, Ill.

[73] Assignee: The Echlin Manufacturing Company, Branford, Conn.

[21] Appl. No.: 60,910

[22] Filed: Jul. 26, 1979

[51] Int. Cl.³ .................. H02K 15/02; H02K 15/14
[52] U.S. Cl. ............................. 29/596; 29/252; 29/402.08; 29/426.2; 29/426.5; 29/732; 29/762
[58] Field of Search .......... 29/596, 732, 762, 426.2, 29/426.5, 402.03, 402.04, 402.05, 402.06, 402.07, 402.08, 252, 234, 281.3

[56] References Cited

U.S. PATENT DOCUMENTS 2,882,590   4/1959   Dovenbos ......................... 29/732

*Primary Examiner*—Carl E. Hall

[57] ABSTRACT

To remove a field structure from within a casing, the casing is positioned with one end thereof against an annular shoulder within an opening of a support fixture engaged with a press element. A removal fixture is inserted into the opposite end of the casing and is engaged by a second press element which is moved toward the first to eject the field structure from within the casing. The removal fixture includes a pair of diametrically opposed wall portions which have side edges spaced to provide slots for clearance of brush rack assemblies and the terminal end portions of the wall portions are of reduced thickness for clearance of field windings and associated components. The support fixture may be in the form of a plate or may be in the form of a tubular member which receives the field structure and which may be positionable above the casing. To install a field structure within a casing, the casing is again engaged with a support fixture position and a field structure is inserted into the opposite end of the casing and is engaged by an installation fixture which is driven by a press element until a stop surface on the installation fixture engages one end of the casing, positioning the field structure at the desired position within the casing.

13 Claims, 9 Drawing Figures

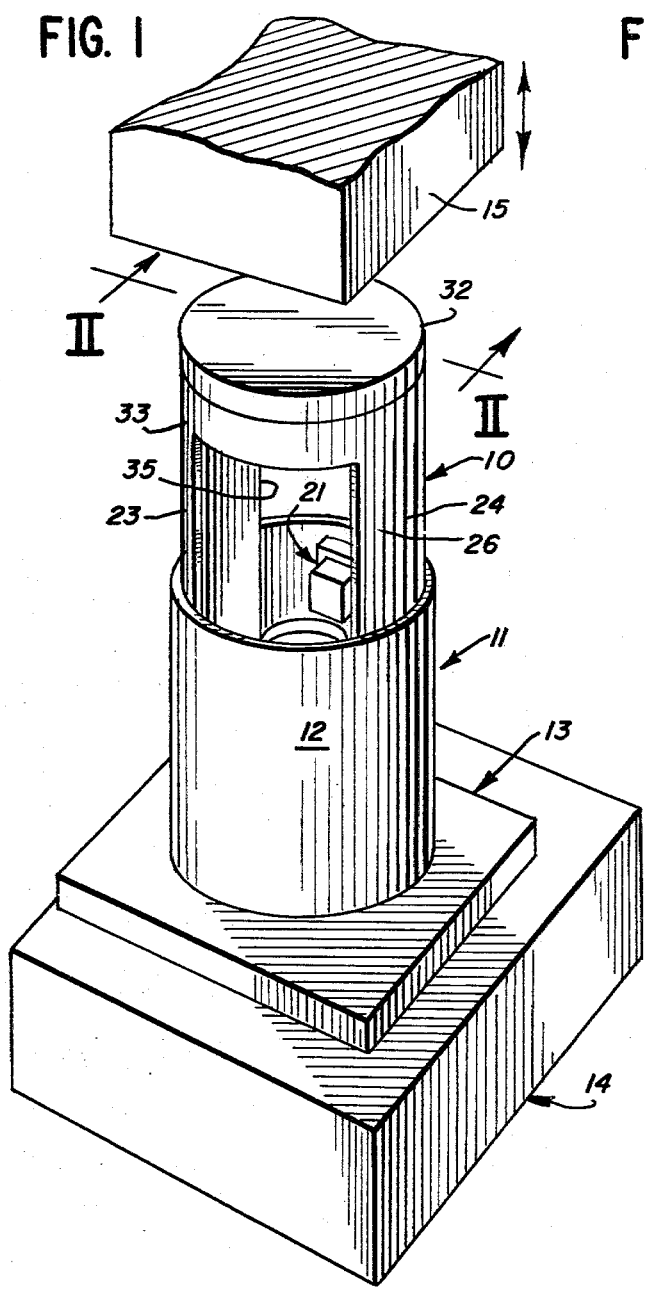
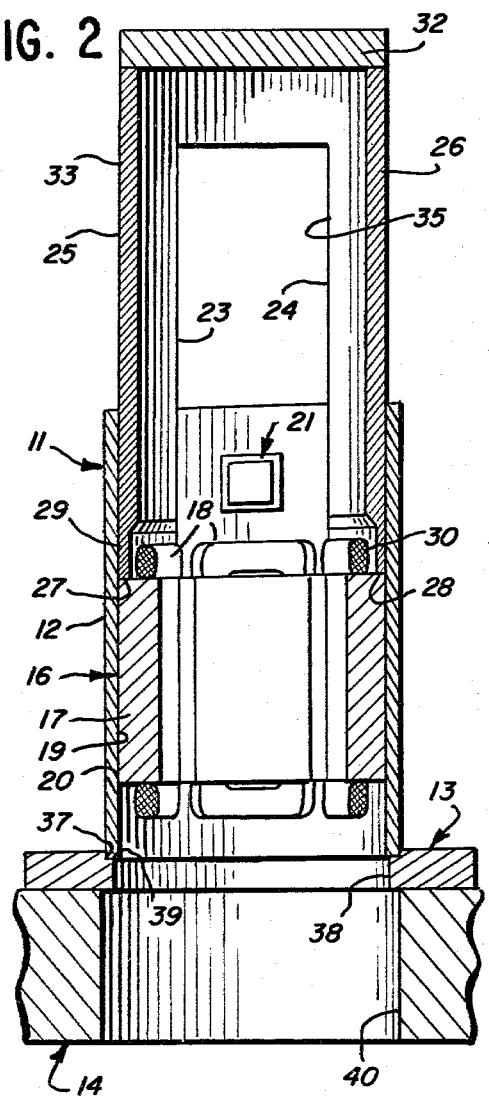
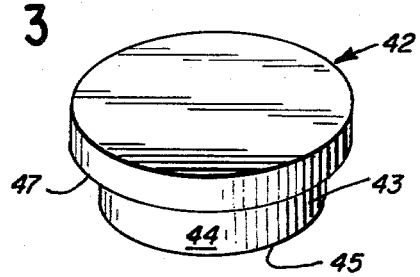
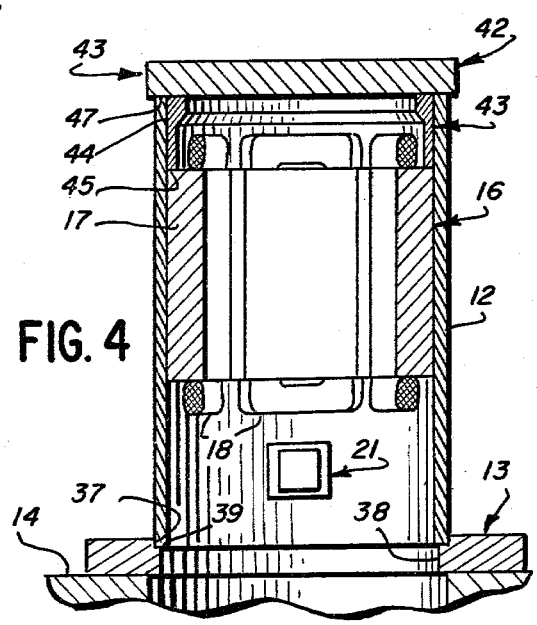

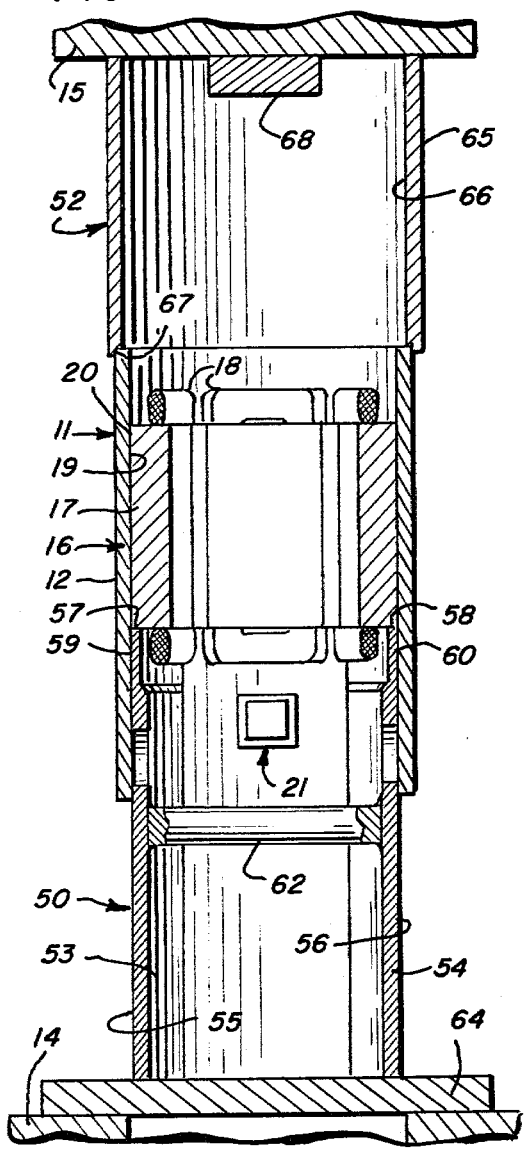
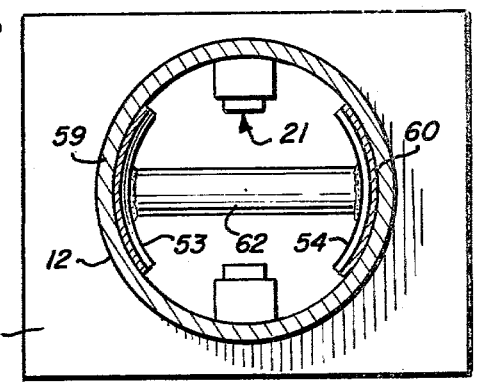
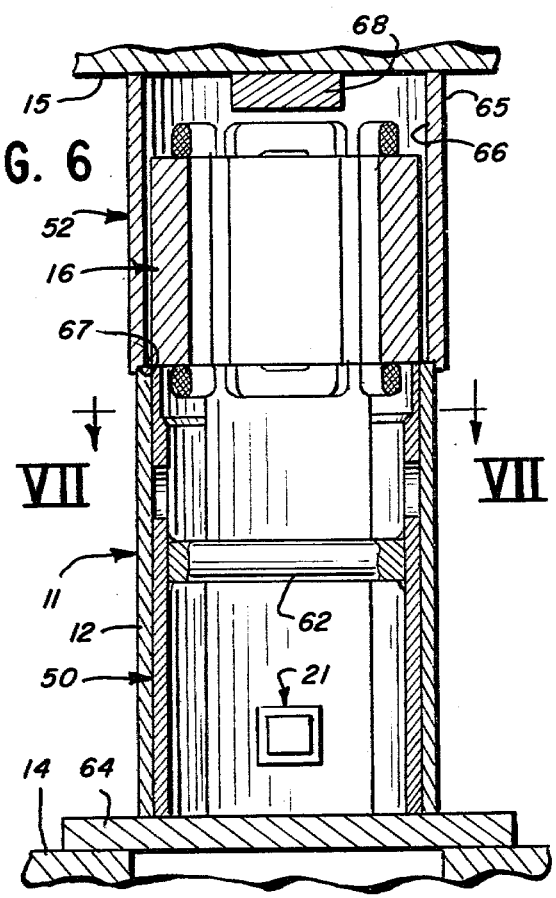
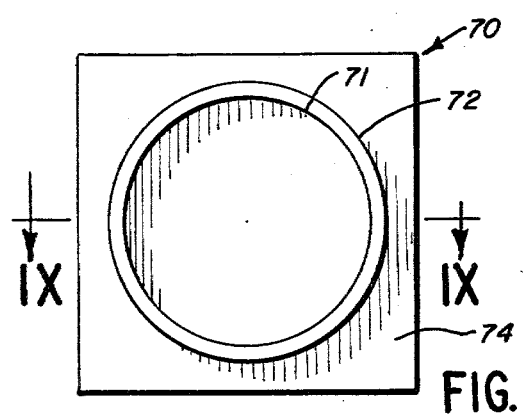
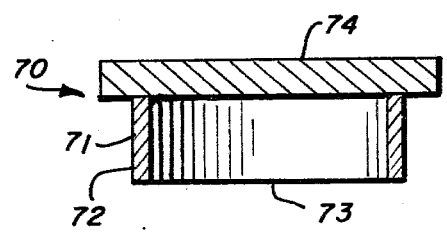

FIXTURES AND METHODS FOR DYNAMO SERVICING

This invention relates to press fixtures and methods for dynamo servicing and more particularly to fixtures and methods with which field structures of starters or other dynamos can be easily and quickly removed from and installed in housings or casings thereof. The fixtures and methods are such as to provide a high degree of accuracy and to minimize the possibility of damage to components of a dynamo.

BACKGROUND OF THE PRIOR ART

The field structures of automobile starters and other dynamos prevent a number of problems when any malfunction occurs. Repair of a field structure without removal from the housing or casing of the dynamo is very difficult and removal of the field structure presents serious difficulties. Generally, there is a drive or press fit between an external cylindrical surface of a poly frame assembly or core of the field structure and the internal cylindrical surface of a housing or casing and considerable force is required to effect relative movement especially when the dynamo has been in use for a length of time. In addition, brush and winding components of the dynamo make it very difficult to use conventional types of tools or fixtures, being in positions such as to interfere with direct engagement with the core of the field structure and also being subject to damage from inadvertent engagement thereof as well as from shocks and vibrations which may occur when attempting to remove the field structure. Replacement of a field structure with a reconditioned or new field structure presents similar problems.

SUMMARY OF THE INVENTION

This invention was evolved with the general object of overcoming the problems of prior art methods and devices and of providing means and methods for facilitating the rapid removal and insulation of field structures while minimizing possible damage to the field structures and other components of a dynamo. In accordance with this invention, apparatus is provided for use between a pair of press elements such as base and ram elements of a hydraulic press, controllably movable toward each other. A removal fixture is provided having an engagement surface for engagement with one of the press elements and having at least a pair of wall portions disposed in diametrically opposed relation with respect to a central axis normal to the engagement surface. The wall portions have cylindrical surface portions for sliding engagement with diametrically opposed portions of the internal cylindrical surface of a casing and have end surfaces in a plane transverse to the central axis for engagement with end surface portions of the core of the field structure. Preferably and in accordance with a specific feature, terminal end portions of the wall portions have a thickness small enough for positioning on the outside of axially projecting portions of the winding means of the dynamo field structure to avoid damage thereto. For use in removal of field structures, the wall portions have a length sufficient for insertion into one end of the casing structure of the dynamo and for ejection of the field structure from the opposite end of the casing structure.

For installation of a field structure in a casing, an installation fixture may preferably include stop surface means for engagement with one end of the casing structure, such being positioned a predetermined distance from the end surfaces of the wall portions engaged with the core, so as to accurately position the field structure at the proper position within the casing of the dynamo.

Another feature which may preferably be used in the removal fixture is to provide relatively large arcuate spacings between opposite side edges of each wall portion and the opposite side edges of the other so as to provide slots for clearance of brush rack assemblies of the dynamo.

The installation fixture is used at the end of the dynamo which is opposite that containing the brush assemblies and the wall portions thereof may be defined by a cylindrical wall.

Another feature of the apparatus is in the provision of a support fixture for receiving and centering one end of the casing. The support fixture may be in the form of a plate having an opening through which the field structure may pass in being ejected from the casing or it may be in the form of a hollow tubular member providing an opening for receiving the field structure.

To remove a field structure, the casing is positioned with one end thereof on the support fixture which may be positioned above the casing when the support fixture is in the form of a hollow tubular member. The removal fixture is positioned with two spaced wall portions thereof within the casing and engaging the core of the field structure, the removal fixture being so positioned that the brush racks are positioned in the slots between the wall portions of the removal fixture. Then the press elements are moved together to drive the field structure out of the casing. For reinstallation of the same field structure or for the reinstallation of a new or reconditioned field structure, one end of the casing is engaged with the support fixture. The field structure is placed in a centered position between the opposite end of the casing and an installation fixture. The installation fixture is then moved toward the support fixture until the stop surfaces of the installation fixture engage an upper end of the casing whereupon the field structure is accurately positioned within the casing.

This invention contemplates other objects, features and advantages which will become more fully apparent from the following detailed description taken in conjunction with the accompanying drawings.

BRIEF DESCRIPTION OF THE DRAWINGS

FIG. 1 is a perspective view illustrating a press fixture in use in removal of a field structure from a starter in accordance with the invention;

FIG. 2 is an elevational sectional view taken substantially along line II—II of FIG. 1;

FIG. 3 is a perspective view of an installation fixture in accordance with the invention;

FIG. 4 is an elevational sectional view similar to FIG. 2 but illustrating the use of the fixture of FIG. 3 in installing a field structure.

FIG. 5 is an elevational sectional view similar to FIG. 2, but illustrating a modified arrangement for removal of a field structure, the elements being shown in an initial condition preparatory to removal of the field structure;

FIG. 6 is an elevational view similar to FIG. 5, but showing the elements in a condition after removal of the field structure;

FIG. 7 is a sectional view taken substantially along line VII—VII of FIG. 6;

FIG. 8 is a plan view of a modified installation fixture; and

FIG. 9 is a sectional view taken substantially along line IX—IX of FIG. 8.

DESCRIPTION OF PREFERRED EMBODIMENTS

Reference numeral 10 generally designates a removal fixture constructed in accordance with the principles of this invention, shown in use in removing a field structure from an automobile starter 11. The starter 11 includes a generally cylindrical casing 12 the lower end of which is seated in a support fixture in the form of a plate 13 which is disposed on a base or table 14 of a press. The press which may be hydraulically operated includes a ram 15 which is movable downwardly toward the table 14 and into engagement with the upper end of the fixture 10 to drive a field structure of the dynamo 11 downwardly out of the lower end of the casing 12.

As shown in FIG. 2, the field structure of the starter 11, generally indicated by reference numeral 16, includes a core 17 of ferromagnetic material having windings 18 thereon. The casing 12 and core 17 are so dimensioned as to provide a press fit between an internal cylindrical surface 19 of the casing 12 and an external cylindrical surface 20 of the core 17. The dynamo 11 further includes a pair of diametrically opposed brush rack assemblies between one end of the casing 12 and the field structure 16, one of such assemblies being diagrammatically depicted in FIGS. 1 and 2 and being indicated by reference numeral 21.

The starter 11 further includes, of course, an armature, end housing members with bearings and other components which are removed prior to removal of a field structure. It is further noted that the housing or casing 12, field structure 16 and brush assembly 21 are illustrated in simplified diagrammatic form and details thereof are not shown for the reason that the invention is applicable to a number of different types of construction of starters, generators or other dynamos.

The fixture 10 includes a pair of wall portions 23 and 24 having outer cylindrical surface portions 25 and 26 for sliding engagement with diametrically opposed portions of the internal surface 19 of the casing 12. End surfaces 27 and 28 of the respective wall portions 25 and 26 are engageable with the core 17 of the field structure 16. Preferably and in accordance with a specific feature of the invention, terminal end portions 29 and 30 of the wall portions 23 and 24 have a thickness small enough for positioning on the outside of the windings 18 or tie bars or other components associated therewith, so as to avoid damage to the windings and winding components.

At the opposite end of the fixture 10, engagement means are provided for engagement by the ram 15 of the press. Such engagement means may be in the form of a circular plate 32 as in the illustrated embodiment; it may also be square or of any other desired shape. Plate 32 may be formed as a separate element which is welded or otherwise adhered to a member 33 of which the wall portions 23 and 24 are an integral part and which is formed as a complete cylinder at its upper end. It is noted that portions of the wall portions 23 and 24 which are between the terminal end portion 29 and 30 and the engagement plate 32 are relatively thick or of increased strength and rigidity, the length of the relatively thin terminal end portions 29 and 30 being only great enough to insure clearance of the windings and associated components.

Each of the wall portions 23 and 24 has opposite side edges which are arcuately spaced from the opposite side edges of the other to provide a pair of slots 35 and 36 for clearing the brush rack 21 and the brush rack diametrically opposed thereto. Thus, the fixture may be used without removal of the brush racks. It is noted, however, that the arcuate dimension of the terminal ends 27 and 28 of the wall portions 23 and 24 is preferably as large as possible, consistent with insuring adequate clearance for brush rack assemblies, so as to distribute the removal force over as large an area as possible.

The support fixture 13 has a radially inwardly facing annular guide surface 27 for engagement with the outer surface of the casing 12 adjacent one end thereof. In addition, the support fixture 13 has a central opening which has a diameter at least equal to the outside diameter of the core 17 so as to permit passage of the core 17 therethrough. An annular shoulder 39 is provided around the upper end of the opening 38 for engagement by the end of the casing 12 and to provide the guide surface 37. It is noted that in the illustrated arrangement, the base 14 of the press has an opening 40 aligned with the opening 38, for receiving the ejected field structure and such openings generally are provided but suitable means could be provided for supporting the support fixture 13 in an elevated position so as to provide space for receiving the ejected field structure.

Referring to FIGS. 3 and 4, reference numeral 42 generally designates an installation fixture constructed in accordance with the principles of this invention and including a member 43 having an external cylindrical surface 44 for sliding engagement with the internal cylindrical surface 19 of the casing 12 and having end surface 45 for engagement with the core 17 of the field structure 16. The fixture 42 further includes a plate 46 for engagement with a press element such as the ram 15, the plate 46 projecting outwardly from the member 43 to provide an annular surface portion 47 for engagement with one end of the casing 12 as illustrated in FIG. 4.

It is noted that the field structure is preferably installed from an end of the casing opposite the end where the brush rack assemblies are mounted so that the brush rack assemblies do not need to be removed and thus the casing 12 in the illustrated arrangement of FIG. 4 is inverted with respect to its position in FIG. 2. It is further noted that the distance between the terminal end surface 45 of the member 43 and the stop surface 47 of the plate 46 is predetermined according to the desired position of the field structure, relative to the end of the casing, to obtain accurate positioning thereof.

As is shown in FIG. 4, the terminal end portion of the member 43 has a thickness small enough for clearance of the windings and associated components and may have a thicker wall portion between the terminal end portion and the engagement plate 46, as illustrated.

It is further noted that the member 43 is cylindrical in the illustrated construction but could be constructed in a manner similar to the fixture 10 to provide wall portions which are separate from each other. In either case, wall portions are provided which are diametrically opposed and which provide the proper guiding action for engagement with the core of the field structure, clearing the windings and associated components.

To remove a field structure, the casing 12 is positioned as shown in FIGS. 1 and 2 with its one end in the support fixture 13 mounted on the base 14 of the press and the fixture 10 is inserted to a position as is also shown in FIGS. 1 and 2. Then the ram 15 of the press is moved downwardly to engage the upper surface of the plate 32 and to move the fixture 10 downwardly to eject the field structure 16 out of the lower end of the casing. Then the casing 12 may be inverted in position as shown in FIG. 4 and a new or reconditioned field structure may be positioned at the upper end of the casing. The fixture 42 is then positioned on top of the field structure after which the ram 15 of the press is moved downwardly to drive the field structure into the casing until the stop surface 47 of the plate 42 engages the upper end of the casing as shown in FIG. 4.

FIG. 5 is a sectional view similar to FIG. 2 but showing a modified removal fixture 50 which is similar to the fixture 10 of FIGS. 1 and 2 and which is usable in place thereof. FIG. 5 also shows a support fixture 52 which is usable to perform a support function such as performed by the base plate 13 in FIGS. 1 and 2. The fixture 52 is also operative to receive the field structure 16 upon removal from the casing 12. The illustrated fixture 52 is generally tubular and has an effective axial length corresponding to the axial length of the field structure 16.

Another feature illustrated in FIGS. 5 and 6 is a removal operation which has an inverted relation to that shown in FIGS. 1 and 2. In FIGS. 1 and 2, the dynamo casing 12 is held in a stationary position and the field structure 16 is moved downwardly during removal. In FIGS. 5 and 6, the casing 12 is moved downwardly, the field structure 16 being held in a stationary position in relation to the table 14 of the press. Thus, in relation to the casing 12, the field structure 16 is moved upwardly to be positioned within the fixture 52 upon removal from the casing 12.

The operation as illustrated in FIGS. 5 and 6 has an advantage in that gravity does not act upon the field structure 16 to propel the structure 16 and its windings 18 against an underlying surface. It is noted that such an operation is made possible through the use of the fixture 52 positioned between the ram 15 of the press and the casing 12 of the dynamo 11. It should also be noted, however, that the fixtures 50 and 52 could be used in a mode of operation similar to that shown in FIGS. 1 and 2. Thus, the fixture 52 could be supported on the table 14 of the press and the fixture 50 could be engaged by the ram 15 of the press to move the field structure 16 downwardly out of the casing 12 and into the fixture 52.

The removal fixture 50 includes a pair of wall portions 53 and 54 which are similar to the wall portions 23 and 24 of the fixture 10 and which have outer cylindrical surface portions 55 and 56 for sliding engagement with diametrically opposed portions of the internal surface 19 of the casing 12. The wall portions 53 and 54 have end surfaces 57 and 58 which are engageable with the core 17 of the field structure 16. Terminal end portions 59 and 60 of the wall portions 53 and 54 have a thickness small enough for positioning on the outside of windings 18 or tiebars or other components associated therewith, so as to avoid damage to the windings and winding components. The fixture 50 differs from the fixture 10 in that a transverse support rod 62 is provided which has opposite ends welded or otherwise rigidly secured to the wall portions 53 and 54. The support rod 62 is positioned in spaced relation to the plane of the end surfaces 57 and 58, just far enough to ensure clearance of the brush rack and other components of the starter or Dynamo.

The fixture 50 also differs from the fixture 10 in that a plate 64 is provided which is similar to the plate 32 but which is rectangular and of increased size, large enough to bridge any opening such as opening 40 which may be provided in the table 14 of the press.

The support fixture 52 includes a wall 65 having an internal cylindrical surface 66, the diameter of which is preferably slightly greater than that of the internal surface 19 of the casing 12. The wall 65 is preferably relatively thick to obtain high strength and it preferably is formed with an annular shoulder 67 adjacent its lower end for seating against the upper edge of the dynamo casing 12.

The fixture 52 within its upper end further includes a transverse bar 68 for increased strength and for engagement by a press member such as the ram 15. It is noted that the spacing between the lower surface of the bar 68 and the plane of the shoulder 67 is sufficient to provide clearance for the field structure 16 when it is driven out of the casing 12. Such clearance may be relatively small so that in the event that the operation is inverted, the field structure will be dropped only a very short distance upon removal so as to avoid damage to the field winding or other components.

FIGS. 8 and 9 illustrate a modified installation fixture 70 which is similar to the fixture 42 of FIGS. 3 and 4 and which includes a member 71 having an external cylindrical surface 72 for sliding engagement with internal cylindrical surface 19 of the casing 12, the member 71 having an end surface 73 for engagement with the core 17 of the field structure 16. The fixture 70 further includes a plate 74 for engagement with a press element. The plate 74 is rectangular, being square in the illustrated construction and its dimensions are preferably such that it can extend over openings of substantial size in the press element with which it is engaged. Thus the fixture 70 may be engaged with a ram element such as the ram 15 or it may be engaged with a table such as the table 14 having an opening 40 therein. In either case, the fixture 52 may be engaged with the casing of the starter or dynamo for support thereof during installation of a field structure. It is noted that the use of the fixture 52 in the installation operation is desirable in that the ram 15 of the press is moved within the same distance range as in the removal operation. Thus, both the removal and installation operations can be performed without adjustment of the press.

It is also noted that in the installation fixture 70 as illustrated, the wall of the member 71 is of uniform thickness and is relatively thick which is desirable for when the fixture is used for dynamos in which there is a corresponding adequate clearance between the outside of windings and the internal surface of the casing. For other dynamos in which the clearance is reduced, the thickness of the terminal end portion of the member 71 may be reduced and the member 71 may have a thicker wall portion between its terminal end portion and the engagement plate 74, attention being invited to the construction of the member 43 in the installation fixture 42 of FIGS. 3 and 4.

It will be understood that modifications and variations may be effected without departing from the spirit and scope of the noval concepts of this invention.

What is claimed is:

1. Apparatus for use between a pair of press elements which are movable toward each other in effecting axial movement of a field structure of a dynamo relative to a casing structure thereof, said field structure including a core having an external cylindrical surface and winding means on said core having portions projecting axially from opposite ends thereof and said casing structure including an internal cylindrical surface engageable by said external cylindrical surface with a press fit, said apparatus comprising: a fixture having an engagement surface for engagement with one of said press elements and at least a pair of wall portions disposed in diametrically opposed relation with respect to a central axis normal to said engagement surface, said wall portions having cylindrical outer surface portions for sliding engagement with diametrically opposed portions of said internal cylindrical surface of said casing structure and having end surfaces in a plane transverse to said central axis for engagement with end surface portions of said core of said field structure.

2. Apparatus as defined in claim 1 wherein terminal end portions of said wall portions have a thickness small enough for positioning on the outside of said axially projecting portions of said winding means to avoid damage thereto.

3. Apparatus as defined in claim 2 wherein said wall portions have portions between said terminal end portions and said engagement means of increased thickness for increased strength and rigidity.

4. Apparatus as defined in claim 1 wherein a pair of brush rack assemblies extend inwardly from diametrically opposite portions of said casing structure between one end of said casing structure and one end of said field structure, and each of said wall portions of said fixture having opposite side edges arcuately spaced from opposite side edges of the other of said wall portions to define a pair of slots for clearing said brush rack assemblies.

5. Apparatus as defined in claim 1 further comprising a base plate having an engagement surface for engagement with one end of said casing structure and having guide surface means engageable with the outer surface of said casing structure adjacent said one end thereof.

6. Apparatus as defined in claim 5 wherein said base plate has an opening of a diameter greater than that of said external cylindrical portion of said core with said engagement surface being in the form of an annular shoulder around said opening.

7. Apparatus as defined in claim 1 wherein said pair of wall portions have an axial length sufficient for insertion into one end of said casing structure and ejection of said field structure from the opposite end of said casing structure.

8. Apparatus as defined in claim 1 wherein said fixture has stop surface means for engagement with one end of said casing structure, said stop surface means being positioned a predetermined distance from said plane of said end surfaces of said wall portions for effecting positioning of said field structure at a predetermined position relative to said casing structure.

9. Apparatus as defined in claim 1, further comprising an additional fixture having an engagement surface for engagement with one of said press elements and at least a pair of wall portions disposed in diametrically opposed relation with respect to a central axis normal to said engagement surface, said wall portions of said additional fixture having cylindrical surface portions for sliding engagement with diametrically opposed portions of said internal cylindrical surface of said casing structure and having end surfaces in a plane transverse to said central axis for engagement with end surface portions of said core of said field structure, said wall portions of said additional fixture having a length sufficient for insertion into one end of said casing structure and ejection of said field structure from the opposite end of said casing structure.

10. Apparatus as defined in claim 9 wherein a pair of brush rack assemblies extend inwardly from diametrically opposite portions of said casing structure between one end of said casing structure and one end of said field structure, each of said wall portions of said additional fixture having opposite edges in arcuately spaced relation to opposite edges of the other of said wall portions to define slots for clearing said brush rack assemblies.

11. In a method for servicing of dynamos including field and casing structures wherein the field structure includes a core having an external cylindrical surface and winding means on the core having portions projecting axially from opposite ends thereof and wherein the casing structure includes an internal cylindrical surface engageable by the external cylindrical surface of the core with a press fit, the steps of providing a fixture including an engagement surface and at least a pair of wall portions disposed in diametrically opposed relation with respect to a central axis normal to the engagement surface with such wall portions having cylindrical outer surface portions for sliding engagement with diametrically opposed portions of the internal cylindrical surface of the casing structure and having end surfaces in a plane transverse to the central axis for engagement with end surface portion of the core of the field structure, supporting the casing structure at one end thereof, inserting the fixture into an opposite end of the casing to engage the end surfaces of the wall portions with end surface portions of the core of the field structure, and engaging and driving said engagement surface to eject the field structure from the casing structure.

12. In a method as defined in claim 11, the further steps of providing an additional fixture having an engagement surface and at least a pair of wall portions disposed in diametrically opposed relation with respect to a central axis normal to the engagement surface with such wall portions having cylindrical outer surface portions for sliding engagement with diametrically opposed portions of the internal cylindrical surface of the casing structure and having end surfaces in a plane transverse to the central axis for engagement with end surface portions of the core of a field structure, disposing a field structure at one end of a casing, engaging the additional fixture with one end of the core of the field structure so positioned, and moving the additional fixture until the field structure is at the proper position in the casing.

13. In a method as defined in claim 12, the further step of providing the additional fixture with a stop surface for engagement with one end of the casing for accurate positioning of the field structure at the desired position in the casing.

* * * * *